F. HALBACH.
CUTTING ATTACHMENT FOR MOTOR VEHICLES.
APPLICATION FILED MAY 16, 1914.

1,122,742.

Patented Dec. 29, 1914.

Witnesses:
Emilie Rehm
Madeline Hirsch

Inventor:
Ferdinand Halbach
by his attorneys
Briesen & Zumpe

UNITED STATES PATENT OFFICE.

FERDINAND HALBACH, OF GOLDENBERG, NEAR REMSCHEID-HADDENBACH, GERMANY.

CUTTING ATTACHMENT FOR MOTOR-VEHICLES.

1,122,742. Specification of Letters Patent. Patented Dec. 29, 1914.

Application filed May 16, 1914. Serial No. 839,047.

*To all whom it may concern:*

Be it known that I, FERDINAND HALBACH, a subject of the German Emperor, and resident of Goldenberg, near Remscheid-Haddenbach, Germany, have invented an Improved Cutting Attachment for Motor-Vehicles, of which the following is a statement.

The present invention relates to an arrangement on motor cars by means of which obstructions, in particular wire ropes and the like drawn across the road shall be rendered ineffective.

The essential feature of the present invention consists in an arrangement which will surely cut such obstructions right through without the travel of the car being discontinued.

Figure 1:
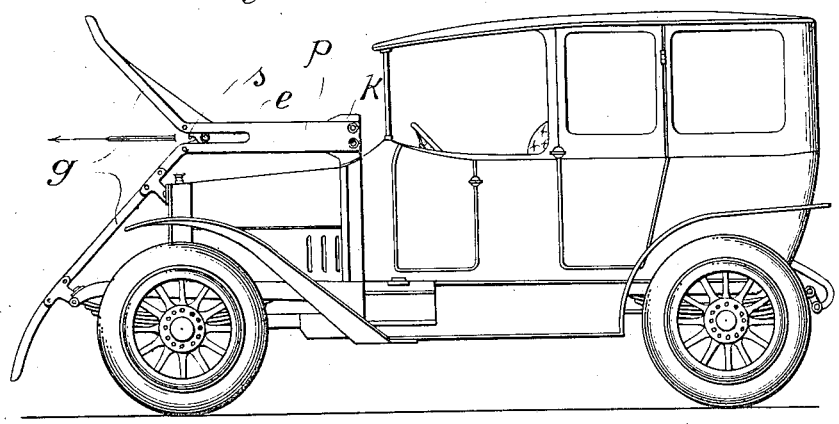
Figure 2:
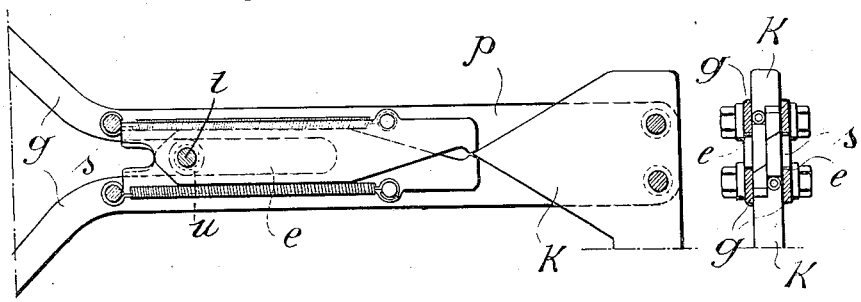
Figure 3:
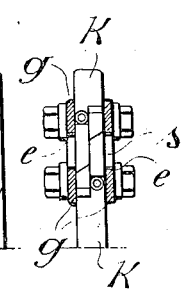
Figure 4:
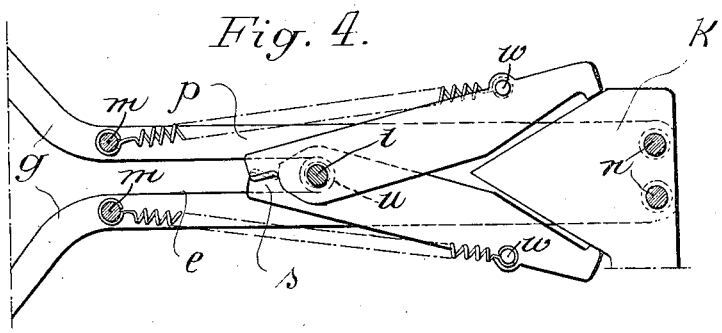

In the accompanying drawing: Figure 1 is a side elevation of a cutting attachment embodying my invention, and showing it applied to a motor car; Fig. 2 is a side view of the cutting attachment detached, showing the shears open; Fig. 3 a cross section of Fig. 2, and Fig. 4 a side view of the cutting attachment detached, showing the shears closed.

The device consists essentially of a pair of spaced upright forks or guides $g$, each having a pair of rearwardly converging shanks. Each guide merges into a plate $p$ having a forwardly opening slot $e$, the plates being connected to each other by front bolts $m$ and rear bolts $n$. Between plates $p$ there are free to slide, a pair of shears $s$, the pivot $t$ of which carries rollers $u$ adapted to travel along the edges of slots $e$. The shears are normally drawn forward by springs $f$ secured at one end to bolts $m$ of plates $p$, and at the other end to bolts $w$ of shears $s$, bolts $m$ likewise constituting forward abutments for the shear blades. Between the rear ends of plates $p$ there is fitted a wedge $k$ which is adapted to be engaged by the shanks of the shears, so as to spread the same and close the blades, as the shears are pushed backward.

The new cutting attachment acts in the following manner: In the case a rope or the like is drawn across the road, it will be caught by the fork and guided into the slot $e$. Here it will enter the open mouth of the shear and press the shear backward in the guide, contrary to the action of the springs $f$. In consequence thereof the legs of the shear are forced apart by the wedge $k$, and the mouth of the shear is closed. As the legs are comparatively long, the shear is closed with great force so that even thick ropes will be cut right through without any noticeable jar. After the rope has been cut the springs will pull the shear forward again, and the mouth will open automatically.

I claim:

A cutting attachment for motor vehicles comprising a shear which is displaceably fitted in a guide, said guide provided with a fork for receiving the rope, a slot for conducting the rope to the shear and a wedge, the said shear held in position by means of springs and adapted to be forced back by the rope caught, against the action of said springs, onto the said wedge, said wedge acting on the legs of the shear and thereby closing the mouth of the same, and severing the rope, the said springs adapted to then draw the shear back into its initial position.

In testimony whereof I have hereunto set my hand in the presence of two subscribing witnesses.

FERDINAND HALBACH. [L. S.]

Witnesses:
HELEN NUFER,
FRANCES NUFER.